United States Patent
Mei et al.

(10) Patent No.: US 12,489,531 B2
(45) Date of Patent: Dec. 2, 2025

(54) DEVICE INTERCONNECTION METHODS AND SYSTEM, VEHICULAR DEVICE, TERMINAL DEVICE, AND STORAGE MEDIUM

(71) Applicant: Beijing Xiaomi Mobile Software Co., Ltd., Beijing (CN)

(72) Inventors: Shaoqing Mei, Beijing (CN); Yu Wang, Beijing (CN); Dongming Sun, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 189 days.

(21) Appl. No.: 18/244,497

(22) Filed: Sep. 11, 2023

(65) Prior Publication Data

US 2024/0106547 A1 Mar. 28, 2024

(30) Foreign Application Priority Data

Sep. 21, 2022 (CN) .......................... 202211153842.1

(51) Int. Cl.
*H04B 11/00* (2006.01)
*G06F 3/14* (2006.01)

(52) U.S. Cl.
CPC ........... *H04B 11/00* (2013.01); *G06F 3/1454* (2013.01)

(58) Field of Classification Search
CPC ............. G01S 15/8913; G01S 7/52036; G01S 7/52028; G01S 15/8925; G01S 15/8927; G01S 7/5202; G01S 15/8993; G01N 29/4427; G01N 29/262; G01N 29/043; G01N 2291/106; H04B 11/00; H04N 21/4365; H04W 4/40; G10L 25/00; H04L 65/401; G06F 3/0484
See application file for complete search history.

(56) References Cited

U.S. PATENT DOCUMENTS

2015/0304484 A1* 10/2015 Halmstad .............. H04W 48/02
                                                              455/419
2021/0349322 A1* 11/2021 Harris ................ G02B 27/0176
(Continued)

FOREIGN PATENT DOCUMENTS

| CN | 105516460 A | 4/2016 | |
|---|---|---|---|
| CN | 113411642 A | 9/2021 | |
| KR | 102099176 B1 * | 8/2013 | ........... G06F 3/1454 |

OTHER PUBLICATIONS

European Patent Office, Extended European Search Report Issued in Application No. 23198145.7, Jan. 29, 2024, Germany, 5 pages.

*Primary Examiner* — Daniel L Murphy
*Assistant Examiner* — Amie N Ndure
(74) *Attorney, Agent, or Firm* — Volpe Koenig

(57) ABSTRACT

A device interconnection method includes: in response to an operation of starting up a screen mirroring application program, starting up the screen mirroring application program, where the screen mirroring application program includes a screen mirroring identifier used in this screen mirroring; generating an audio file carrying the screen mirroring identifier; and playing the audio file at least once to generate an acoustic wave signal, such that a screen mirroring application program in a terminal device collects the acoustic wave signal, and establishes a screen mirroring link with the vehicular device based on the screen mirroring identifier in the acoustic wave signal.

18 Claims, 7 Drawing Sheets

---

In response to an operation of starting up a screen mirroring application program, start up the screen mirroring application program, where the screen mirroring application program includes a screen mirroring identifier used in this screen mirroring ~11

Generate an audio file carrying the screen mirroring identifier ~12

Play the audio file at least once to generate an acoustic wave signal, such that a screen mirroring application program in a terminal device collects the acoustic wave signal, and establishes a screen mirroring link with the vehicular device based on the screen mirroring identifier in the acoustic wave signal ~13

(56) References Cited

U.S. PATENT DOCUMENTS

2022/0365739 A1\* 11/2022 Chang .................. H04L 51/066
2022/0368548 A1\* 11/2022 Chang ................ G06F 3/04886
2022/0368659 A1\* 11/2022 Chang .................. H04L 65/403
2022/0368742 A1\* 11/2022 Chang ................ H04L 65/1073

\* cited by examiner

DEVICE INTERCONNECTION METHODS AND SYSTEM, VEHICULAR DEVICE, TERMINAL DEVICE, AND STORAGE MEDIUM

CROSS REFERENCE TO RELATED APPLICATIONS

This application claims priority to Chinese Patent Application No. 202211153842.1 filed on Sep. 21, 2022, the entire contents of which is incorporated herein by reference.

TECHNICAL FIELD

The present disclosure relates to the field of communication technologies, and in particular to device interconnection methods, a device interconnection system, a vehicular device, a terminal device, and a storage medium.

BACKGROUND

In order to improve the interestingness and conveniences of driving, users usually use a device in a vehicle (referred to as vehicular device) to realize the functions such as navigation, music play, and the like. Since the vehicular device usually has no communication function and the user's smart phones have a good communication function, the users usually mirror their smart phones to the vehicular device so as to satisfy their requirements and achieve the effect of creating a comfortable experience scenario in the vehicle.

In practical uses, a screen mirroring application (APP) is installed in both the smart phone and the vehicular device, and the screen mirroring application includes a wired screen mirroring mode and a wireless screen mirroring mode. Since the wireless screen mirroring mode does not require the user to connect a cable, that is, the user has a low participation sense, the user is more inclined to use the wired screening mode to connect the smart phone to the vehicular device.

In the existing solutions, the wireless screen mirroring mode requires the user to manually input an identifier of the vehicular device to achieve connection of the smart phone and the vehicular device. But, in the above operation process, the user usually shifts his attention to the vehicular device, leading to inability to observe the surrounding environment of the vehicle in a short time, and hence endangering the safety of vehicle and person.

SUMMARY

The present disclosure provides device interconnection methods, a device interconnection system, a vehicular device, a terminal device, and a storage medium so as to solve the shortcomings in the related arts.

According to a first aspect of embodiments of the present disclosure, there is provided a device interconnection device, which is applied to a vehicular device. The method includes: in response to an operation of starting up a screen mirroring application program, starting up the screen mirroring application program, where the screen mirroring application program includes a screen mirroring identifier used in this screen mirroring; generating an audio file carrying the screen mirroring identifier; and playing the audio file at least once to generate an acoustic wave signal, such that a screen mirroring application program in a terminal device collects the acoustic wave signal, and establishes a screen mirroring link with the vehicular device based on the screen mirroring identifier in the acoustic wave signal.

In an embodiment, generating the audio file that carries the screen mirroring identifier includes: obtaining a character string corresponding to the screen mirroring identifier; based on a preset correspondence between frequency and character, obtaining a frequency corresponding to each character of the character string to obtain a frequency array corresponding to the screen mirroring identifier; and encoding the frequency array to obtain an audio file corresponding to the frequency array.

In an embodiment, encoding the frequency array to obtain the audio file corresponding to the frequency array includes: based on each frequency of the frequency array, a preset sampling rate and a sampling point position, obtaining a sine wave signal corresponding to each frequency of the frequency array; based on the preset sampling rate, the sampling point position and a preset loudness coefficient, obtaining an amplitude of the sine wave signal; and based on the amplitude and the sine wave signal, obtaining an audio code corresponding to each frequency of the frequency array, where the audio code corresponding to each frequency of the frequency array forms the audio file.

In an embodiment, based on each frequency of the frequency array, the preset sampling rate and the sampling point position, obtaining the sine wave signal corresponding to each frequency includes: obtaining a product of each frequency of the frequency array, the sampling point position and a first preset constant to obtain a first product; obtaining a quotient value of the first product and the preset sampling rate to obtain the first quotient value; and obtaining a sine wave signal corresponding to the first quotient value to obtain the sine wave signal corresponding to each frequency of the frequency array.

In an embodiment, based on the preset sampling rate, the sampling point position and the preset loudness coefficient, obtaining the amplitude of the sine wave signal includes: obtaining a median of the sampling point of each syllable and a squared value of the median to obtain a first squared value; obtaining a squared value of a difference between the sampling point position and the median to obtain a second squared value; obtaining a difference between a second preset constant and the second squared value; obtaining a square root of a ratio of the difference to the first squared value; and obtaining a product of the square root and the preset loudness coefficient to obtain the amplitude of the sine wave signal.

In an embodiment, the method further includes: broadcasting an interconnection request, where the interconnection request includes a broadcast identifier configured to allow the terminal device to start up the screen mirroring application program in response to the broadcast identifier.

In an embodiment, based on the screen mirroring identifier in the acoustic wave signal, establishing the screen mirroring link with the vehicular device includes: receiving a screen mirroring connection request from the terminal device, where the screen mirroring connection request includes the screen mirroring identifier and the broadcast identifier; determining whether the screen mirroring identifier in the screen mirroring connection request is consistent with a locally-stored screen mirroring identifier, and when the screen mirroring identifier in the screen mirroring connection request is consistent with the locally-stored screen mirroring identifier, sending vehicular device connection information; and coordinating an authentication key and a session key with the terminal device to establish a screen mirroring link.

According to a second aspect of embodiments of the present disclosure, there is provided a device interconnection method, which is applied to a terminal device. The method includes: enabling an audio collection function of the terminal device; based on the audio collection function, obtaining an acoustic wave signal carrying a screen mirroring identifier to obtain an acoustic wave file; analyzing the acoustic wave file to obtain the screen mirroring identifier; and based on the screen mirroring identifier in the acoustic wave signal, establishing a screen mirroring link with a vehicular device.

In an embodiment, analyzing the acoustic wave file to obtain the screen mirroring identifier includes: performing Fourier Transform processing on the acoustic wave file to obtain a frequency array in the acoustic wave file; where the frequency array is a combination of multiple frequencies; and based on a preset correspondence between frequency and character, obtaining a character corresponding to each frequency of the frequency array, where the character corresponding to each frequency of the frequency array forms the screen mirroring identifier.

In an embodiment, enabling the audio collection function of the terminal device includes: in response to receiving an interconnection request including a broadcast identifier, starting up a screen mirroring application program; and in response to an audio collection enabling request of the screen mirroring application program, enabling the audio collection function of the terminal device.

In an embodiment, based on the screen mirroring identifier in the acoustic wave signal, establishing the screen mirroring link with the vehicular device includes: sending a screen mirroring connection request, where the screen mirroring connection request includes the screen mirroring identifier and the broadcast identifier; obtaining vehicular device connection information, where the vehicular device connection information is generated when the screen mirroring identifier in the screen mirroring connection request is consistent with a screen mirroring identifier locally stored by the vehicular device; and coordinating an authentication key and a session key with the vehicular device to establish a screen mirroring link.

According to a third aspect of embodiments of the present disclosure, there is provided a device interconnection method, which includes: in response to detecting a trigger operation for a vehicular device, displaying, by the vehicular device, a screen mirroring identifier in this screen mirroring, and playing, by the vehicular device, an audio file carrying the screen mirroring identifier at least once; by a terminal device, starting up a screen mirroring application program and enabling an audio collection function of the terminal device, and based on the audio collection function, obtaining an acoustic wave signal carrying the screen mirroring identifier to obtain an acoustic wave file, and based on the screen mirroring identifier in the acoustic wave signal, establishing a screen mirroring link with the vehicular device; and sharing, by the vehicular device, currently-displayed contents of the terminal device through the screen mirroring link.

According to a fourth aspect of embodiments of the present disclosure, there is provided a device interconnection system, which includes: a vehicular device and a terminal device, where the vehicular device and the terminal device are configured to perform the method of the third aspect.

According to a fifth aspect of embodiments of the present disclosure, there is provided a vehicular device, which includes: a processor; and a memory storing computer programs executable by the processor, where the processor is configured to execute the computer programs to perform the method of any one of the first aspect.

According to a sixth aspect of embodiments of the present disclosure, there is provided a terminal device, which includes: a processor; and a memory storing computer programs executable by the processor, where the processor is configured to execute the computer programs to perform the method of any one of the second aspect.

According to a seventh aspect of embodiments of the present disclosure, there is provided a non-transitory computer readable storage medium, storing computer programs thereon, where the programs, when executed by a processor, cause the processor to perform the method of any one of the first to third aspects.

It should be understood that the above general descriptions and subsequent detailed descriptions are merely illustrative and explanatory rather than limiting of the present disclosure.

BRIEF DESCRIPTION OF DRAWINGS

The accompanying drawings, which are incorporated in and constitute a part of the present description, illustrate embodiments consistent with the present disclosure and serve to explain the principles of the present disclosure together with the description.

DETAILED DESCRIPTION

Figure 1:
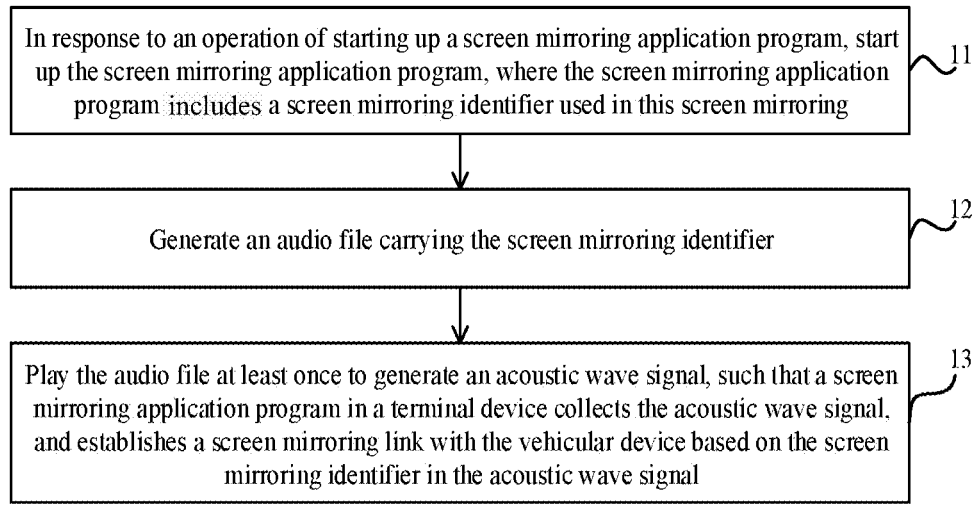
FIG. 1 is a flowchart illustrating a device interconnection method according to an exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims. It is noted that in case of no conflicts, the following embodiments and the features of the embodiments can be mutually combined.

In order to solve the above technical problems, an embodiment of the present disclosure provides device interconnection methods and apparatuses, a vehicular device, a terminal device, and a storage medium. The device interconnection methods may be applied to a vehicular device and a terminal device and the like. To help understand the solutions of the present disclosure, the solutions of the device interconnection methods will be described with the vehicular device and the terminal device as an execution subject in the following embodiments.

FIG. 1 is a flowchart illustrating a device interconnection method according to an exemplary embodiment of the present disclosure. As shown in FIG. 1, the device interconnection method may include steps 11 to 13.

At step 11, in response to an operation of starting up a screen mirroring application program, the screen mirroring application program is started up. The screen mirroring application program includes a screen mirroring identifier used by this screen mirroring operation.

In this embodiment, the vehicular device includes a display screen which can display a screen mirroring identifier or the contents displayed on the screen of the terminal device or other indicative contents including a menu and the like. It can be understood that the above contents are only the contents relating to the solutions of the present disclosure, and those skilled in the arts can select other contents based on specific scenario and thus the corresponding solutions will fall within the scope of protection of the present disclosure.

In this embodiment, the vehicular device may display a desktop. When a user clicks the above desktop, the vehicular device may display a menu which includes a screen mirroring function. The screen mirroring refers to that the contents displayed on a display screen of one device are synchronously displayed on the other device. In the embodiments of the present disclosure, the screen mirroring refers to that the display screen of the terminal device is mirrored to the display screen of the vehicular device, namely, the display screen of the vehicular device is used as the display screen of the terminal device.

In this embodiment, when the vehicular device displays a screen mirroring function, the user may trigger the screen mirroring function, for example, by clicking a screen mirroring button, or a manual screen mirroring button or the like. The vehicular device may detect an operation of the user, for example, an operation of starting up a screen mirroring application program. When it is detected that the screen mirroring application program on the vehicular device is started up or the button is triggered, the vehicular device may start up the screen mirroring application program in response to the operation of starting up the screen mirroring application program.

Figure 2:
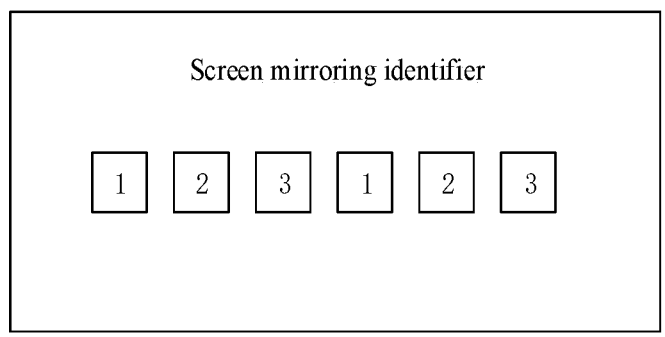
FIG. 2 is a schematic diagram illustrating a screen mirroring identifier according to an exemplary embodiment of the present disclosure.

Since the user starting up the screen mirroring application program usually has a screen mirroring requirement, after the screen mirroring application program is started up in this embodiment, a screen mirroring identifier used by this screen mirroring operation is included in the screen mirroring application program. It can be understood that the screen mirroring identifier may be invariable or updated based on a preset period (e.g., 30 seconds). Furthermore, the above screen mirroring identifier may have a length of 4 to 10 digits, and in an example, the length of the screen mirroring identifier may be a 6-digit number, as shown in FIG. 2.

In an embodiment, the vehicular device may broadcast an interconnection request which includes a broadcast identifier used to enable the terminal device to start up a screen mirroring application program in response to the broadcast identifier.

In this embodiment, a communication module, for example, a low-power-consumption Bluetooth module (BLE-BT), is disposed in the vehicular device, and the communication module has a broadcast function to broadcast the broadcast identifier of the vehicular device. The broadcast identifier includes but is not limited to a vehicle identifier of a vehicle where the vehicular device is located, a universally unique identifier (UUID), and the like, which can be set based on specific scenarios. Thus, the corresponding solutions fall within the scope of protection of the present disclosure.

In this embodiment, after the screen mirroring application program is started up, the vehicular device may broadcast an interconnection request to its surrounding space, where the interconnection request may include a broadcast identifier. Thus, a terminal device within a preset scope of the vehicular device may receive the interconnection request. The preset scope may refer to a spherical space or a part of the spherical space formed with the vehicular device as a center of circle and a preset radius as a radius.

For example, the communication module is a low-power-consumption Bluetooth module, and the above interconnection request may include the contents shown in Table 1.

TABLE 1

| Contents of interconnection request | | |
|---|---|---|
| Byte offset | Identifier | Data contents |
| 0 | Length | 0x02 |
| 1 | Ad type | 0x01 |
| 2 | Flags | 0x02 |
| 3 | Length | 0x11 |
| 4 | Ad type | 0x07 |
| 5~21 | Service UUID | Broadcast UUID |
| 22 | Length | 0x12 |
| 23 | Ad type | 0x16 |
| 24~25 | Data UUID | Vehicle information UUID, 0x01, 0x00 |
| 26 | Primary version | 0x01 |
| 27 | Secondary version | 0x00 |
| 28 | Broadcast sequence number | 0x66 |
| 29~35 | Vehicle identifier | 6-byte vehicle unique identifier |
| 36~37 | Vehicle manufacturer ID | 2-byte vehicle ID |
| 38~39 | Vehicle model | 2-byte vehicle model |
| 40~41 | Self-defined | Self-defined |
| 42~43 | Retained | Retained |

In an embodiment, the interconnection request generates multiple data packets based on LTV, where L represents a length of one set of data; T represents a type of one set of data; and V represents a specific value of the data.

The length of a first set of data (Type=0x01) is fixed bytes used for preliminary message screening. The Service UUID of a second set of data (Type=0x07) is a service identifier, which is a string of 16 bytes of data used to ensure the uniqueness of the broadcast in the vehicular device and indicate a corresponding application program. The value of a third set of data (Type=0x16) represents vehicle-related information.

Data UUID represents the data message type; primary version/secondary version represents a version number of a screen mirroring application program in the vehicular device. Broadcast sequence number represents that after the screen mirroring application program in the vehicular device is started up, multiple message broadcasts (BLE) may be performed, where the broadcast sequence numbers are same at this time. When the screen mirroring application program is restarted up after being exited, the broadcast sequence number for message broadcast will be changed. The Vehicle identifier is used to represent vehicle uniqueness, and vehicle manufacturer ID represents vehicle manufacturer, where a unique ID is assigned to each vehicle manufacturer. The vehicle model represents the uniqueness of the vehicle model and is assigned by the vehicle manufacturer. Self-defined represents a self-defined message in the screen mirroring application program in the vehicular device; retained represents protocol-retained message.

As shown in Table 1, Service UUID is a service identifier which is a string of 16 bytes of data used to ensure the uniqueness of the broadcast in the vehicular device and indicate a corresponding application program.

In this embodiment, a communication module is disposed in the terminal device and the communication module matches the communication module in the vehicular device and can scan signals based on a preset period. In this way, the communication module in the terminal device can scan an interconnection request broadcast by the vehicular device.

In this embodiment, after receiving the above interconnection request, the terminal device may analyze the interconnection request to obtain the broadcast identifier in the interconnection request. If the screen mirroring application program pre-stores a strategy of generating interconnection request and analyzing interconnection request, the terminal device may, based on the generation strategy of the interconnection request, select a matching analysis strategy so as to quickly obtain the broadcast identifier. The terminal device, after obtaining the broadcast identifier, may find a matching application program, i.e., the screen mirroring application program. At this time, the terminal device may start up the above screen mirroring application program.

Figure 3:
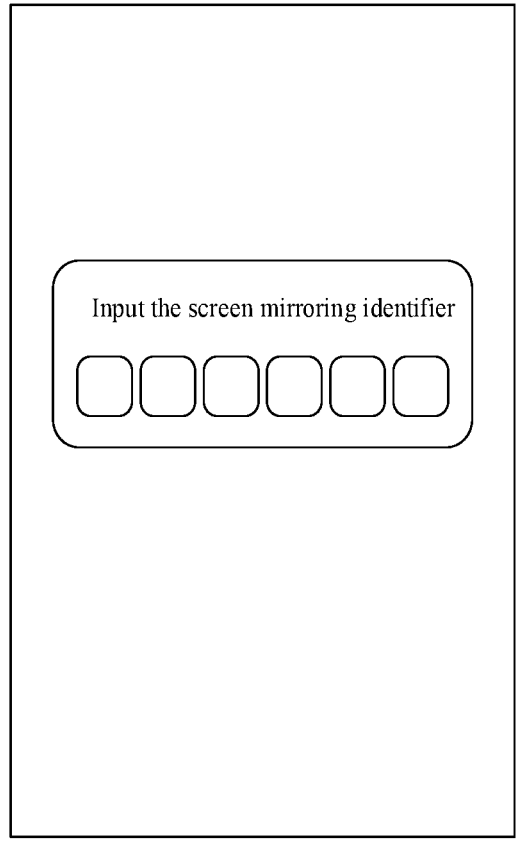
FIG. 3 is a schematic diagram illustrating an input window for a screen mirroring identifier according to an exemplary embodiment of the present disclosure.

In an embodiment, after starting up the screen mirroring application program, the terminal device may display a screen mirroring identifier input window as shown in FIG. 3. The user may manually input the screen mirroring identifier displayed by the vehicular device into the screen mirroring identifier input window. After detecting presence of the screen mirroring identifier in the identifier input window, the terminal device may establish a screen mirroring link with the vehicular device based on the identifier. It is noted that the process of establishing a screen mirroring link will be described in the following embodiments and no descriptions are made herein.

Since manually inputting the screen mirroring identifier will require the attention of the user, if the user performs this operation during a drive process, the travel safety will be affected. Therefore, in another embodiment, there is provided a solution of transmitting the screen mirroring identifier by an acoustic wave. The acoustic wave transmission of the screen mirroring identifier eliminates manual input of the user. Based on this, the method reduces interference for the user, thereby ensuring the travel safety.

Returning to FIG. 1, at step 12, an audio file carrying the screen mirroring identifier is generated.

Figure 4:
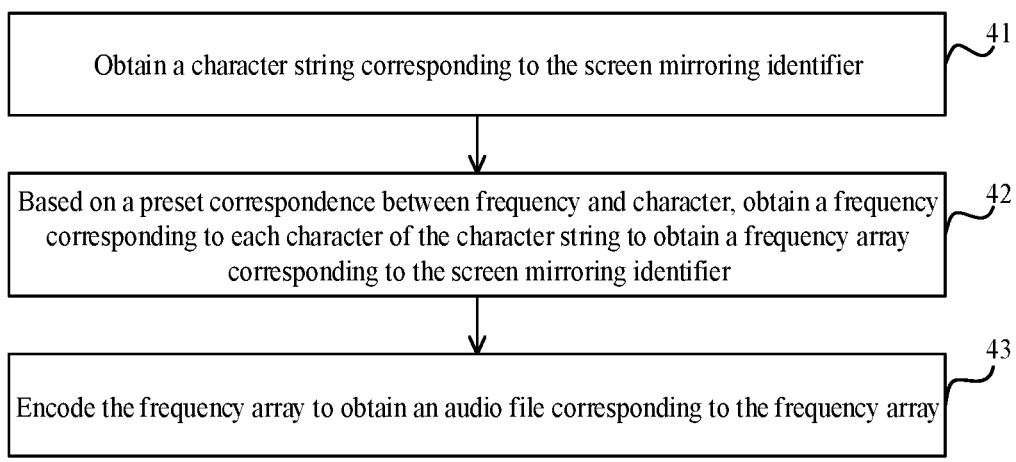
FIG. 4 is a flowchart of obtaining an audio file according to an exemplary embodiment of the present disclosure.

In this embodiment, the vehicular device may generate an audio file carrying the screen mirroring identifier through steps 41 to 43 as shown in FIG. 4.

At step 41, the vehicular device obtains a character string corresponding to the screen mirroring identifier.

In this step, the vehicular device may obtain the screen mirroring identifier and the character string corresponding to the screen mirroring identifier before displaying the screen mirroring identifier. Because the keyboard can input 96 American Standard Code for Information Interchange (ASCII) code characters, namely, 0 to 9, A to Z, a to z, + and −, totaling 96 characters, the vehicular device may obtain the character string corresponding to the screen mirroring identifier.

At step 42, based on a preset correspondence between frequency and character, the vehicular device obtains a frequency corresponding to each character in the character string so as to obtain a frequency array corresponding to the screen mirroring identifier.

In this embodiment, the vehicular device stores a preset correspondence between frequency and character. Still with the ASCII codes as example, the preset correspondence between frequency and character may be as shown in Table 2.

TABLE 2

Correspondence between frequency and character

| | Script offset (n) | | | | | | | |
|---|---|---|---|---|---|---|---|---|
| | 0 | 1 | 2 | 3 | . . . | 95 | 96 | 97 |
| ASCII code characters | Space | ! | " | # | . . . | ~ | Start flag | End flag |
| Frequency Hz | 1000 | 1050 | 1100 | 1150 | 1000 + 50*n | 5750 | 5800 | 5850 |

As shown in Table 2, there are a total of 98 characters including 96 ASCII codes and 2 flag symbols. "Start flag" refers to a position at which analysis is started in the audio file; "end flag" refers to a position at which analysis is ended in the audio file. Thus, by adding the two check bits "start flag" and "end flag", the success rate of transmitting the screen mirroring identifier can be ensured.

It should be noted that the value of the frequency in the preset correspondence between frequency and character may be set based on actual situations. For example, the character "!" corresponds to the frequency 1050 Hz, i.e. the sine wave signal of 1050 Hz; the character " " " corresponds to the frequency 1100 Hz, i.e. the sine wave signal of 1100 Hz and so on. In this way, the correspondence shown in Table 2 can be obtained.

In this embodiment, the vehicular device may, based on the above correspondence between frequency and character and the characters in the character string, obtain a frequency corresponding to each character so as to obtain a frequency array corresponding to the screen mirroring identifier. For example, if the screen mirroring identifier is "! "#! "#", the frequencies corresponding to the characters "!" """ " "#" "!" """ " and "#" in the screen mirroring identifier are "1050" "1100" "1150" "1050" "1100" and "1150". The vehicular device may determine a frequency array as {1050, 1100, 1150, 1050, 1100, 1150}.

At step 43, the vehicular device encodes the frequency array to obtain an audio file corresponding to the frequency array.

Figure 5:
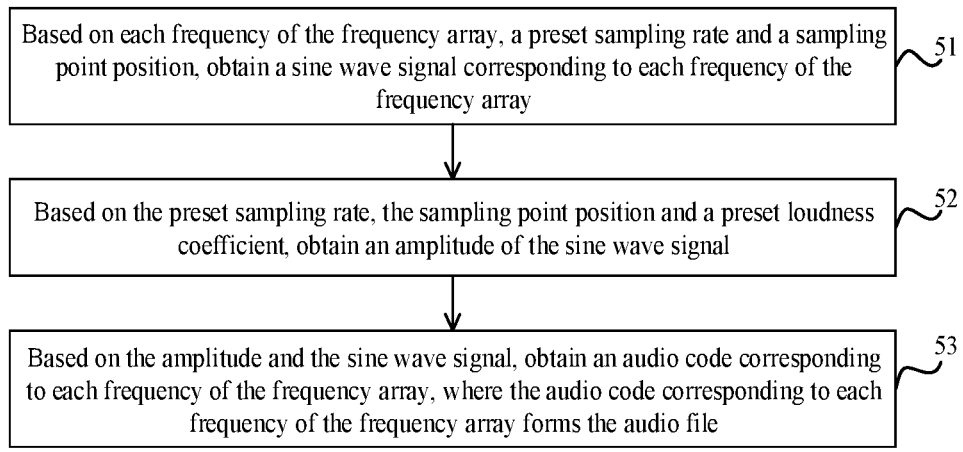
FIG. 5 is a flowchart of obtaining an audio file according to an exemplary embodiment of the present disclosure.

In this embodiment, the vehicular device may encode the above frequency array to obtain an audio file corresponding to the frequency array through steps 51 to 53 as shown in FIG. 5.

At step 51, based on each frequency of the frequency array, a preset sampling rate and a sampling point position, the vehicular device obtains a sine wave signal corresponding to each frequency.

In this step, the vehicular device may obtain each frequency of the frequency array, the preset sampling rate (sample_rate), and the sampling point position (frame). Where the preset sampling rate refers to a sampling rate at which the terminal device collects the acoustic wave signal when the vehicular device plays the audio file. For example, 44100 Hz; the sampling point position refers to a left sound channel sample and a right sound channel sample in the audio file.

Figure 6:
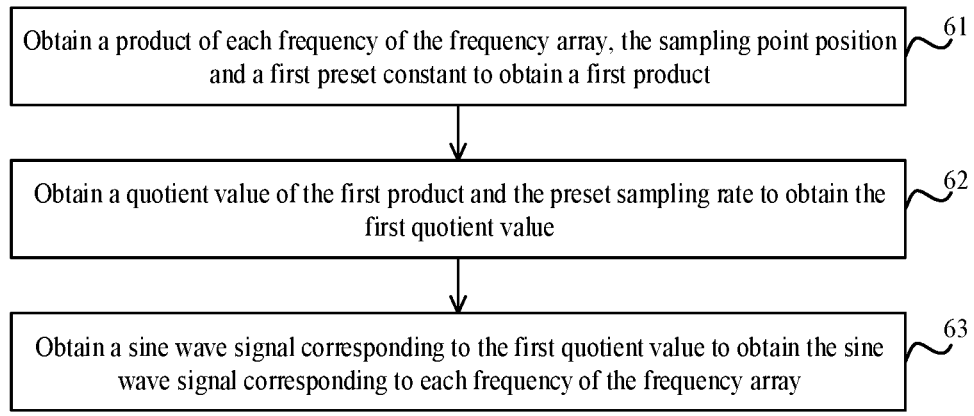
FIG. 6 is a flowchart of obtaining a sine wave signal according to an exemplary embodiment of the present disclosure.

In one example, the vehicular device may, based on each frequency, the preset sampling rate (sample_rate) and the sampling point position (frame), obtain the sine wave signal corresponding to each frequency through steps 61 to 63 as shown in FIG. 6.

At step 61, the vehicular device obtains a product of each frequency of the frequency array, the sampling point position and a first preset constant (e.g., $2*\pi$) to obtain a first product; for example, the first product is frame$*2*\pi*$frequency.

At step 62, the vehicular device obtains a quotient value of the first product and the preset sampling rate to obtain a first quotient value. For example, the first quotient value is $$\frac{frame * 2 * \pi * frequency}{sample\_rate}.$$

At step 63, the vehicular device obtains a sine wave signal corresponding to the first quotient value to obtain the sine wave signal corresponding to each frequency. For example, the sine wave signal is $$\cos \frac{frame * 2 * \pi * frequency}{sample\_rate}.$$

Returning to FIG. 5, in step 52, the vehicular device obtains an amplitude of the sine wave signal based on the preset sampling rate, the sampling point position and the preset loudness coefficient.

In this step, the vehicular device may obtain the preset sampling rate (sample_rate), the sampling point position (frame) and the preset loudness coefficient (max_volume). The preset loudness coefficient (max_volume) is used to adjust a size of the loudness (amplitude) of the sine wave signal.

Figure 7:
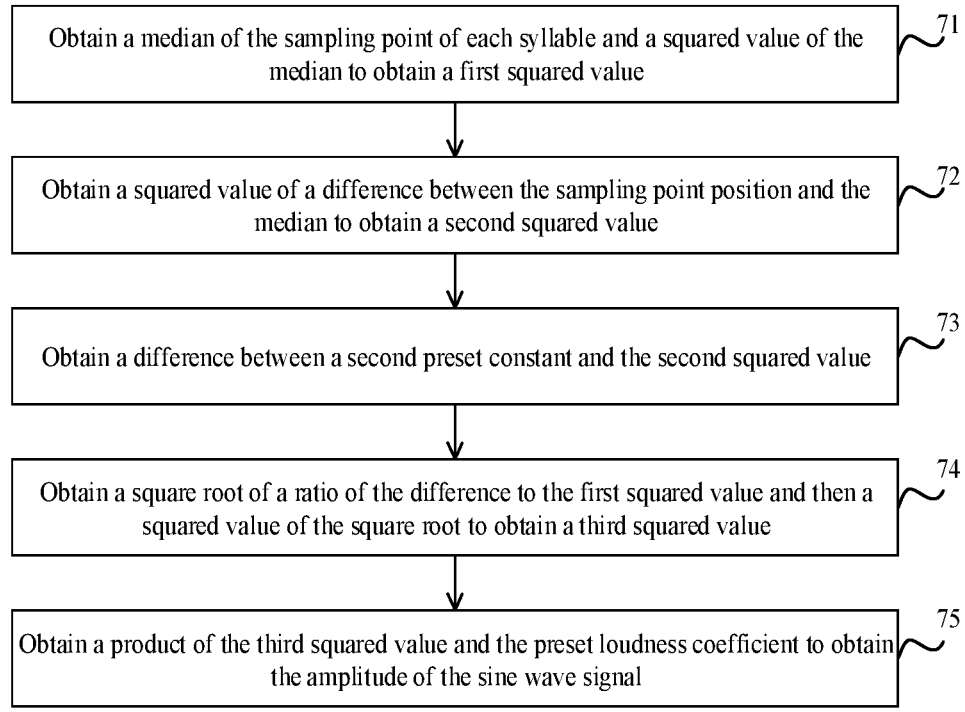
FIG. 7 is a flowchart of obtaining an amplitude of a sine wave signal according to an exemplary embodiment of the present disclosure.

In this step, the vehicular device may obtain the amplitude of the sine wave signal based on the preset sampling rate, the sampling point position, and the preset loudness coefficient through steps 71 to 75 as shown in FIG. 7.

At step 71, the vehicular device obtains a median of the sampling point (unit_sample) of each syllable and a squared value of the median so as to obtain a first squared value. The median in the sampling point (unit_sample) of each syllable is $$\frac{unit\_sample}{2}$$

and thus, the first squared value is $$\left(\frac{unit\_sample}{2}\right)^2.$$

The sampling point of each syllable refers to a product of a sampling frequency and a collection time.

At step 72, the vehicular device obtains a squared value of a difference between the sampling point position and the median, so as to obtain a second squared value. For example, the second squared value is $$\left(frame - \frac{unit\_sample}{2}\right)^2.$$

At step 73, the vehicular device obtains a difference between a second preset constant (e.g., the value is 1) and the second squared value. For example, the above difference is $$1 - \left(frame - \frac{unit\_sample}{2}\right)^2.$$

At step 74, the vehicular device obtains a square root of a ratio of the difference to the first squared value.

For example, the above square root is $$\sqrt{\frac{1 - \left(frame - \frac{unit\_sample}{2}\right)^2}{\left(\frac{unit\_sample}{2}\right)^2}}.$$

At step 75, the vehicular device obtains a product of the square root and the preset loudness coefficient to obtain an amplitude of the sine wave signal.

For example, the above amplitude is $$max\_volume * \sqrt{\frac{1 - \left(frame - \frac{unit\_sample}{2}\right)^2}{\left(\frac{unit\_sample}{2}\right)^2}}.$$

Returning to FIG. 5, in step 53, the vehicular device, based on the amplitude and the sine wave signal, obtains an audio code corresponding to each frequency, where the audio code corresponding to each frequency forms the audio file.

In this step, the vehicular device may obtain the audio code corresponding to each frequency based on the above amplitude and the sine wave signal, as shown in the formula (1) below:

$$\max\_volume * \sqrt{\frac{1 - \left(\text{frame} - \frac{\text{unit\_sample}}{2}\right)^2}{\left(\frac{\text{unit\_sample}}{2}\right)^2}} * \cos\frac{\text{frame} * 2 * \pi * \text{frequency}}{\text{sample\_rate}}. \quad (1)$$

In this embodiment, the vehicular device performs audio encoding on each frequency of the frequency array to generate audio codes which form the audio file. The audio file includes the sine wave signal of the frequency corresponding to the start flag, the sine wave signal of the frequency corresponding to the end flag and the sine wave signal of the frequency corresponding to each character between the start flag and the end flag.

In an embodiment, the format of the above audio file is as shown in Table 3.

TABLE 3

| Format of the audio file | | |
|---|---|---|
| Start flag | Frequency corresponding to 6-digit identifier | End flag |
| | Audio segment | |

Returning to FIG. 1, in step 13, the audio file is played at least once to generate an acoustic wave signal such that a screen mirroring application program in the terminal device collects the acoustic wave signal and based on the screen mirroring identifier in the acoustic wave signal, establishes a screen mirroring link with the vehicular device.

In this embodiment, the vehicular device may start up a player to play the audio file and a loudspeaker of the vehicular device may generate an acoustic wave signal emitted to its surrounding space. In order to ensure the success rate of receiving the acoustic wave signal by the terminal device, the audio file is sent cyclically in this embodiment, namely, the audio file is played several times. For example, the audio time length corresponding to each frequency is 100 milliseconds and the audio time length of the audio file containing 8 frequencies is 800 milliseconds. Thus, the audio file can be played 25 times within 20 seconds, so as to ensure the terminal device can successfully receive the screen mirroring identifier. At this time, the format of the audio file is as shown in Table 4.

TABLE 4

| | Format of the audio file | | | | | | | |
|---|---|---|---|---|---|---|---|---|
| Start flag | Frequency corresponding to 6-digit identifier | End flag | Start flag | Frequency corresponding to 6-digit identifier | End flag | Start flag | Frequency corresponding to 6-digit identifier | End flag |
| Audio segment 1 | | | Audio segment 2 | | | Audio segment 3 | | ... |

It can be understood that each element in Tables 1, 2, 3, and 4 is independent and these elements are illustrated in a same table, which does not mean all elements in each of the Tables must exist as the same as shown in the Tables. The value of each element therein is not dependent on the value of any other element in Tables. Thus, those skilled in the arts can understand that the value of each element in Tables 1, 2, 3, and 4 is one independent embodiment.

In an embodiment, the terminal device may start up a microphone which collects the above acoustic wave signal so as to obtain a sample file. For ease of descriptions, the sample file is referred to as an acoustic wave file. Then, the terminal device may analyze the acoustic wave file. For example, the terminal device may perform Fourier Transform processing on the acoustic wave file to obtain multiple frequencies in the acoustic wave file, where the multiple frequencies form the frequency array. The Fourier Transform processing may include but is not limited to kiss_FFT. Then, based on the preset correspondence between frequency and character, the terminal device may obtain a character corresponding to each frequency of the frequency array, where the character corresponding to each frequency of the frequency array forms the screen mirroring identifier.

In this embodiment, the terminal device may generate a screen mirroring connection request, where the screen mirroring connection request may include the screen mirroring identifier and the broadcast identifier. Then, the terminal device may broadcast the screen mirroring connection request.

In this embodiment, the vehicular device may receive the screen mirroring connection request and analyze out the screen mirroring identifier from the screen mirroring connection request and determine whether a locally-stored screen mirroring identifier is consistent with the screen mirroring identifier in the screen mirroring connection request. When the locally-stored screen mirroring identifier is consistent with the screen mirroring identifier in the screen mirroring connection request, the vehicular device may receive the screen mirroring connection request of the terminal device and establish Bluetooth connection (e.g., BLE-GATT connection) with the terminal device. Then, the vehicular device may generate vehicular device connection information, and send the above vehicular device connection information through the Bluetooth connection. The vehicular device connection information may include but not limited to: Service Set Identifier (SSID), phase-shift keying (PSK), MAC address, IP port and the like. Then, based on information in the vehicular device connection information, the vehicular device and the terminal device may establish a connection channel (e.g., WiFi P2P connection channel) and then perform the processes of coordinating an authentication key and a session key and the like to establish a screen mirroring link and start the screen mirroring service.

Therefore, in the solutions provided by the embodiments of the present disclosure, in response to an operation of starting up a screen mirroring application program, the screen mirroring application program is started up, where the screen mirroring application program includes a screen mirroring identifier used by this screen mirroring operation. Then, an audio file carrying the screen mirroring identifier is generated. Finally, the audio file is played at least once to generate an acoustic wave signal such that a screen mirroring application program in the terminal device collects the acoustic wave signal and based on the screen mirroring identifier in the acoustic wave signal, establishes a screen mirroring link with the vehicular device. Thus, the vehicular device can send the screen mirroring identifier by playing the audio file so as to establish a screen mirroring link between the vehicular device and the terminal device, therefore improving the screen mirroring efficiency. Furthermore, the users do not need to manually input an identifier on the vehicular device. Based on this, the users's attention is not affected, thus helping increase the drive safety.

Figure 8:
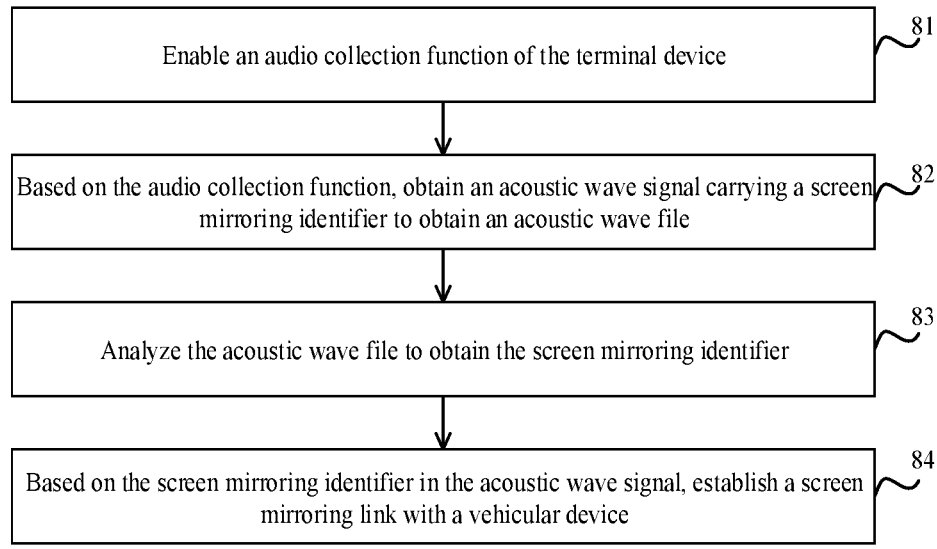
FIG. 8 is a flowchart of establishing a screen mirroring link according to an exemplary embodiment of the present disclosure.

FIG. 8 is a flowchart illustrating a device interconnection method according to an exemplary embodiment of the present disclosure, where the method is applied to a terminal device. As shown in FIG. 8, the device interconnection method includes steps 81 to 84.

At step 81, an audio collection function of the terminal device is enabled.

In this embodiment, the communication module in the terminal device may scan signals based on a period to obtain an interconnection request broadcast by the vehicular device. Then, the terminal device may analyze the interconnection request to obtain the broadcast identifier in the interconnection request. If the screen mirroring application program pre-stores a strategy of generating interconnection request and analyzing interconnection request, the terminal device may, based on the generation strategy of the interconnection request, select a matching analysis strategy so as to quickly obtain the broadcast identifier. The terminal device, after obtaining the broadcast identifier, finds a matching application program, i.e. the screen mirroring application program. At this time, the terminal device may start up the above screen mirroring application program. After the screen mirroring application program is started up, the screen mirroring application program generates an audio collection enable request and thus the terminal device enables the audio collection function of the terminal device, for example, enable a loudspeaker.

At step 82, based on the audio collection function, an acoustic wave signal carrying a screen mirroring identifier is obtained so as to obtain an acoustic wave file.

In this embodiment, when the vehicular device plays the audio file, the loudspeaker in the terminal device collects the acoustic wave signal to obtain an acoustic wave file. It is understood that the acoustic wave file includes the screen mirroring identifier.

At step 83, the acoustic wave file is analyzed to obtain the screen mirroring identifier.

In this embodiment, the terminal device analyzes the acoustic wave file, for example, by performing Fourier Transform processing on the acoustic wave file to obtain multiple frequencies in the acoustic wave file, where the multiple frequencies form a frequency array. The Fourier Transform processing may include but is not limited to kiss_FFT. Then, based on a preset correspondence between frequency and character, the terminal device may obtain a character corresponding to each frequency of the frequency array, where the character corresponding to each frequency of the frequency array forms the screen mirroring identifier.

At step 84, based on the screen mirroring identifier in the acoustic wave signal, a screen mirroring link is established with the vehicular device.

In this embodiment, the terminal device generates a screen mirroring connection request which includes the screen mirroring identifier and the broadcast identifier. Then, the terminal device broadcasts the above screen mirroring connection request.

In this embodiment, the vehicular device receives the screen mirroring connection request and analyzes out the screen mirroring identifier from the screen mirroring connection request and determines whether a locally-stored screen mirroring identifier is consistent with the screen mirroring identifier in the screen mirroring connection request. When the locally-stored screen mirroring identifier is consistent with the screen mirroring identifier in the screen mirroring connection request, the vehicular device receives the screen mirroring connection request of the terminal device and establishes Bluetooth connection (e.g., BLE-GATT connection) with the terminal device.

In this embodiment, the vehicular device may generate vehicular device connection information, and send the vehicular device connection information through the Bluetooth connection. The vehicular device connection information may include but is not limited to: Service Set Identifier (SSID), phase-shift keying (PSK), MAC address, IP port, and the like. Then, based on information in the vehicular device connection information, the vehicular device and the terminal device may establish a connection channel (e.g., WiFi P2P connection channel) and then perform the processes of coordinating an authentication key and a session key and the like to establish a screen mirroring link and start the screen mirroring service.

In this embodiment, the vehicular device sends the screen mirroring identifier by playing the audio file so as to establish a screen mirroring link between the vehicular device and the terminal device, thus improving the screen mirroring efficiency. Furthermore, in this embodiment, the users do not need to manually input an identifier on the vehicular device and thus their attention is not affected, which increases the drive safety.

Figure 9:
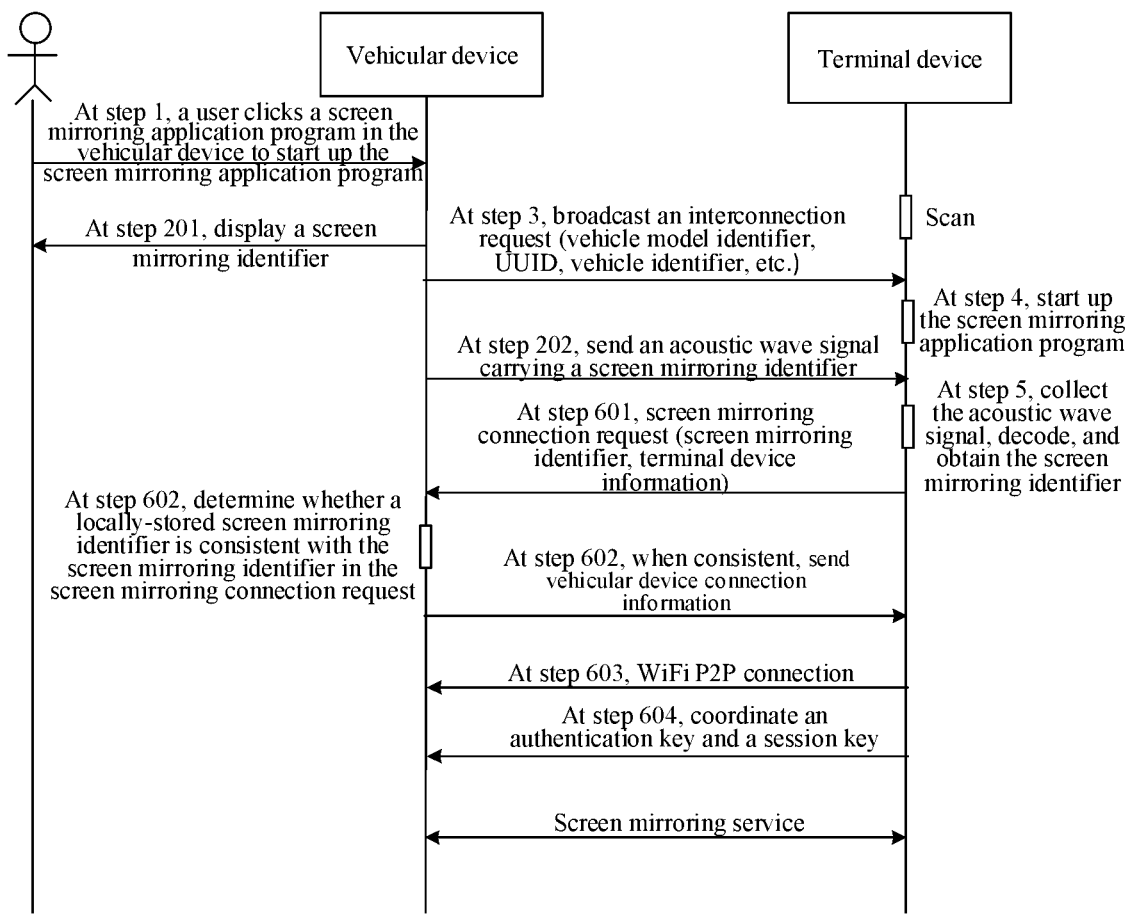
FIG. 9 is an interaction diagram illustrating a device interconnection method according to an exemplary embodiment of the present disclosure.
Figure 10:
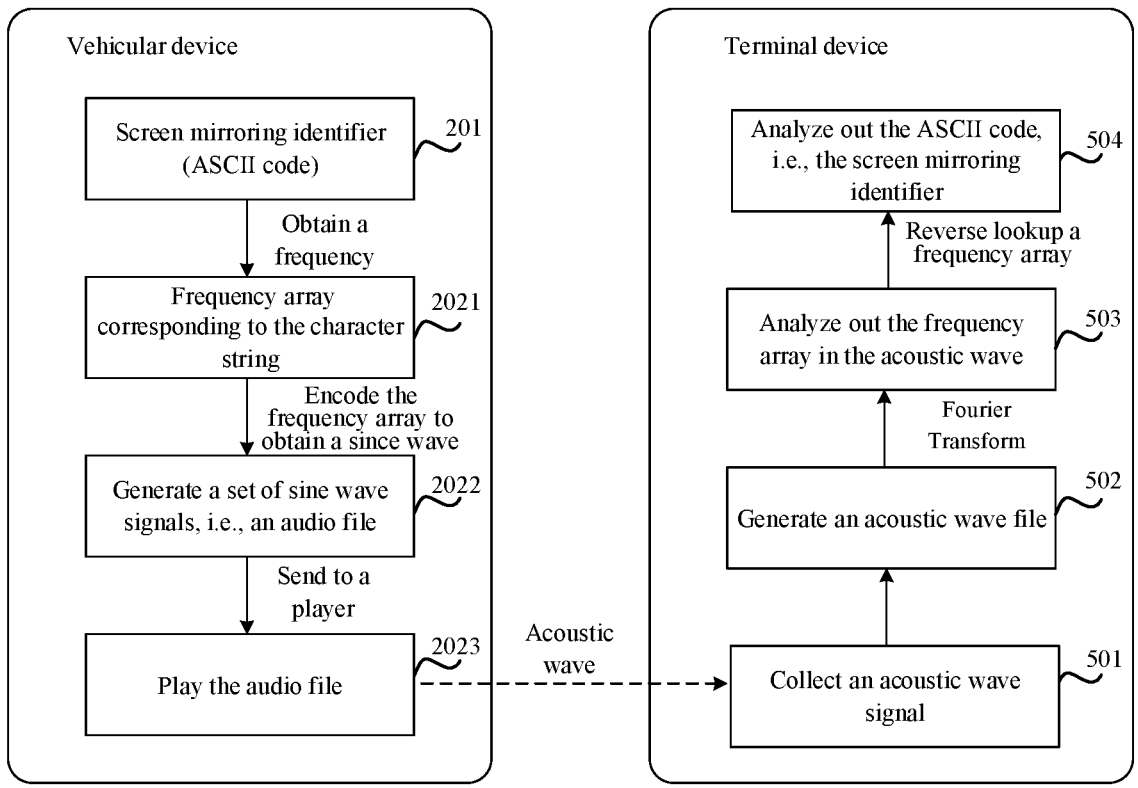
FIG. 10 is a flowchart of transmitting a screen mirroring identifier by an acoustic wave according to an exemplary embodiment of the present disclosure.

On the basis of the device interconnection method provided by the present disclosure, a process of interconnection between the vehicular device and the terminal device will be described below. As shown in FIGS. 9 and 10, the process includes the following steps 1 to 6.

At step 1, a user clicks a screen mirroring application program in the vehicular device to start up the screen mirroring application program.

At step 201, after the screen mirroring application program is started up, a screen mirroring identifier is displayed on the screen as shown in FIG. 2. The user may determine whether to manually input the screen mirroring identifier. At step 202, the vehicular device may obtain frequency array corresponding to the character string (step 2021 as shown in FIG. 10), encode the screen mirroring identifier to obtain an audio file (step 2022 as shown in FIG. 10), and then play the audio file to transmit an acoustic wave signal to the terminal device (step 2023 as shown in FIG. 10), so as to realize automatic transmission of the screen mirroring identifier. In this step, the screen mirroring experiences can be provided through several solutions.

At step 3, after the screen mirroring application program of the vehicular device is started up, the vehicular device uses a low-power-consumption Bluetooth module to broadcast an interconnection request. The interconnection request includes but is not limited to a vehicle identifier, and the broadcast identifier and the like. At this time, the terminal device may scan a signal to obtain the above interconnection request.

At step 4, after receiving the above interconnection request, the terminal device starts up a screen mirroring application program. At the same time, the screen mirroring application program may enable an audio collection function. After obtaining the above interconnection request, the terminal device may determine the vehicular device has a screen mirroring need based on the broadcast identifier (service UUID). Then, the terminal device starts up the screen mirroring application program and enables the audio collection function.

In one example, after the screen mirroring application program is started up, the terminal device may display a screen mirroring identifier input window as shown in FIG. 3. At this time, the user may manually input the screen mirroring identifier. After the screen mirroring identifier is input, the terminal device may establish a screen mirroring link with the vehicular device.

In another example, the terminal device may execute the solution of transmission of the screen mirroring identifier by the acoustic wave signal, that is, execute step 5.

At step 5, the terminal device collects the acoustic wave signal (step 501 as shown in FIG. 10), to obtain an acoustic wave file (step 502 as shown in FIG. 10). Then, the terminal device decodes the above acoustic wave file to obtain the screen mirroring identifier, specifically, Fourier Transform processing on the acoustic wave file is performed to obtain a frequency array in the acoustic wave file (step 503 as shown in FIG. 10), and based on a preset correspondence between frequency and character, a character corresponding to each frequency of the frequency array is obtained, where the character corresponding to each frequency of the frequency array forms the screen mirroring identifier (step 504 as shown in FIG. 10). In this solution, the screen mirroring identifier can be automatically transmitted. This simplifies the operation procedure and keeps the attention of the user (e.g., the driver) undistracted and improves the travel safety and use conveniences.

After obtaining the screen mirroring identifier, the terminal device performs information confirmation and interaction with the vehicular device based on the screen mirroring identifier to complete the interconnection between the terminal device and the vehicular device, so as to start the screen mirroring service. For example, at step 601, the vehicular device may receive the above screen mirroring connection request from the terminal device and analyze out the screen mirroring identifier from the screen mirroring connection request. At step 602, when it is determined that a locally-stored screen mirroring identifier is consistent with the screen mirroring identifier in the screen mirroring connection request, the vehicular device may establish BLE-GATT connection with the terminal device, and send relevant information required by high-speed channel P2P through the BLE-GATT connection, where the information includes SSID, PSK, MAC address and IP port and the like. At step 603, the vehicular device and the terminal device may establish WiFi P2P connection channel. At step 604, the vehicular device and the terminal device coordinate an authentication key and a session key, then start the screen mirroring service.

Figure 11:
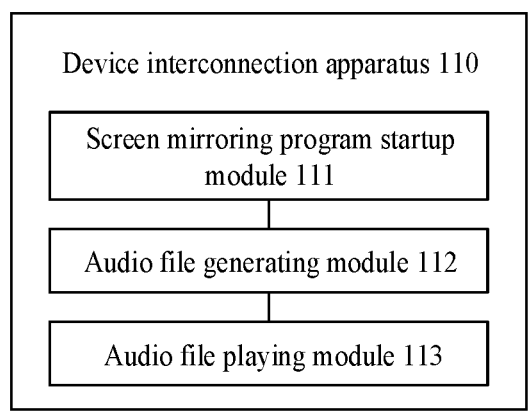
FIG. 11 is a block diagram illustrating a device interconnection apparatus according to an exemplary embodiment of the present disclosure.

On the basis of the device interconnection method provided by the embodiments of the present disclosure, an embodiment of the present disclosure further provides a device interconnection apparatus 110, which is applied to a vehicular device. As shown in FIG. 11, the apparatus 110 includes: a screen mirroring program startup module 111, an audio file generating module 112, and an audio file playing module 113. The screen mirroring program startup module 111 is configured to, in response to an operation of starting up a screen mirroring application program, start up the screen mirroring application program. Where the screen mirroring application program includes a screen mirroring identifier used by this screen mirroring operation. The audio file generating module 112 is configured to generate an audio file carrying the screen mirroring identifier. The audio file playing module 113 is configured to play the audio file at least once to generate an acoustic wave signal such that a screen mirroring application program in a terminal device collects the acoustic wave signal and based on the screen mirroring identifier in the acoustic wave signal, establishes a screen mirroring link with the vehicular device.

In an embodiment, the audio file generating module 112 includes: a character string obtaining sub-module, configured to obtain a character string corresponding to the screen mirroring identifier; a frequency array obtaining sub-module, configured to, based on a preset correspondence between frequency and character, obtain a frequency corresponding to each character in the character string to obtain a frequency array corresponding to the screen mirroring identifier; and an audio file obtaining sub-module, configured to encode the frequency array to obtain an audio file corresponding to the frequency array.

In an embodiment, the audio file includes a start flag, an end flag, characters located between the start flag and the end flag, and frequencies corresponding to the start flag, the end flag and each character.

In an embodiment, the audio file obtaining sub-module includes: a sine wave signal obtaining unit, configured to, based on each frequency of the frequency array, a preset sampling rate and a sampling point position, obtain a sine wave signal corresponding to each frequency; a sine wave amplitude obtaining unit, configured to, based on the preset sampling rate, the sampling point position and a preset loudness coefficient, obtain an amplitude of the sine wave signal; and an audio file obtaining unit, configured to, based on the amplitude and the sine wave signal, obtain an audio code corresponding to each frequency, where the audio code corresponding to each frequency forms the audio file.

In an embodiment, the sine wave signal obtaining unit includes: a first product obtaining sub-unit, configured to obtain a product of each frequency of the frequency array, the sampling point position and a first preset constant to obtain a first product; a first quotient value obtaining sub-unit, configured to obtain a quotient value of the first product and the preset sampling rate to obtain the first quotient value; and a sine wave signal obtaining sub-unit, configured to obtain a sine wave signal corresponding to the first quotient value to obtain the sine wave signal corresponding to each frequency.

In an embodiment, the sine wave amplitude obtaining unit includes: a median obtaining sub-unit, configured to obtain a median of the sampling point of each syllable and a squared value of the median to obtain a first squared value; a first squared value obtaining sub-unit, configured to obtain a squared value of a difference between the sampling point position and the median to obtain a second squared value; a difference obtaining sub-unit, configured to obtain a difference between a second preset constant and the second squared value; a second squared value obtaining sub-unit, configured to obtain a square root of a ratio of the difference to the first squared value; and a sine wave amplitude obtaining sub-unit, configured to obtain a product of the square root and the preset loudness coefficient to obtain the amplitude of the sine wave signal.

In an embodiment, the apparatus 110 further includes: an interconnection request broadcasting module (not shown), configured to broadcast an interconnection request. The interconnection request includes a broadcast identifier used to enable the terminal device to start up the screen mirroring application program in response to the broadcast identifier.

In an embodiment, the apparatus 110 further includes a screen mirroring link module (not shown), configured to, based on the screen mirroring identifier in the acoustic wave signal, establish the screen mirroring link with the terminal device.

The screen mirroring link module includes: a screen mirroring request receiving sub-module, configured to receive a screen mirroring connection request from the terminal device, where the screen mirroring connection request includes the screen mirroring identifier and the broadcast identifier; an identifier determining sub-module, configured to determine whether the screen mirroring identifier in the screen mirroring connection request is consistent with a locally-stored screen mirroring identifier; a connection information sending sub-module, configured to, when the screen mirroring identifier in the screen mirroring connection request is consistent with the locally-stored screen mirroring identifier, send vehicular device connection information; and a screen mirroring link establishing sub-module, configured to coordinate an authentication key and a session key with the terminal device to establish a screen mirroring link.

It is noted that the apparatus embodiments in this embodiment match the contents of the method embodiments and thus can be referred to with the contents of the method embodiments and will not be repeated herein.

Figure 12:
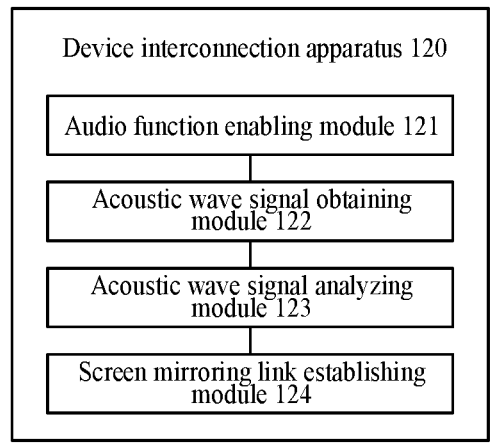
FIG. 12 is a block diagram illustrating a device interconnection apparatus according to another exemplary embodiment of the present disclosure.

On the basis of the device interconnection method provided by the embodiments of the present disclosure, an embodiment of the present disclosure further provides a device interconnection apparatus 120, which is applied to a terminal device. As shown in FIG. 12, the apparatus 120 includes: an audio function enabling module 121, an acoustic wave signal obtaining module 122, an acoustic wave signal analyzing module 123, and a screen mirroring link establishing module 124. The audio function enabling module 121 is configured to enable an audio collection function of the terminal device. The acoustic wave signal obtaining module 122 is configured to, based on the audio collection function, obtain an acoustic wave signal carrying a screen mirroring identifier to obtain an acoustic wave file. The acoustic wave signal analyzing module 123 is configured to analyze the acoustic wave file to obtain the screen mirroring identifier. The screen mirroring link establishing module 124 is configured to, based on the screen mirroring identifier in the acoustic wave signal, establish a screen mirroring link with a vehicular device.

In an embodiment, the acoustic wave signal analyzing module 123 includes: a frequency array obtaining sub-module, configured to perform Fourier Transform processing on the acoustic wave file to obtain a frequency array in the acoustic wave file; where the frequency array is a combination of multiple frequencies; and a screen mirroring identifier obtaining sub-module, configured to, based on a preset correspondence between frequency and character, obtain a character corresponding to each frequency of the frequency array, where the character corresponding to each frequency of the frequency array forms the screen mirroring identifier.

In an embodiment, the apparatus 120 further includes: a screen mirroring application startup module (not shown), configured to, in response to receiving an interconnection request including a broadcast identifier, start up a screen mirroring application program; and an audio collection enabling module (not shown), configured to, in response to an audio collection enabling request of the screen mirroring application program, enable the audio collection function of the terminal device.

In an embodiment, the screen mirroring link establishing module 124 includes: a screen mirroring request sending sub-module, configured to send a screen mirroring connection request, where the screen mirroring connection request includes the screen mirroring identifier and the broadcast identifier; a connection information obtaining module, configured to obtain vehicular device connection information, where the vehicular device connection information is generated when the screen mirroring identifier in the screen mirroring connection request is consistent with a screen mirroring identifier locally stored by the vehicular device; and a screen mirroring link establishing sub-module, configured to coordinate an authentication key and a session key with the vehicular device to establish a screen mirroring link.

It is noted that the apparatus embodiments in this embodiment match the contents of the method embodiments and thus can be referred to with the contents of the method embodiments and will not be repeated herein.

On the basis of the device interconnection method provided by the embodiments of the present disclosure, an embodiment of the present disclosure further provides a device interconnection system, which includes a vehicular device and a terminal device. In response to detecting a trigger operation for the vehicular device, the vehicular device displays a screen mirroring identifier used by this screen mirroring operation; the vehicular device plays an audio file carrying the screen mirroring identifier at least once; a terminal device starts up a screen mirroring application program and enables an audio collection function of the terminal device, and based on the audio collection function, obtains an acoustic wave signal carrying a screen mirroring identifier to obtain an acoustic wave file, and then based on the screen mirroring identifier in the acoustic wave signal, establishes a screen mirroring link with the vehicular device; the vehicular device shares the currently-displayed contents of the terminal device based on the screen mirroring link.

It is noted that the system embodiments in this embodiment match the contents of the method embodiments and can be referred to with the contents of the method embodiments shown in FIGS. 1 and 8 and will not be repeated herein.

Figure 13:
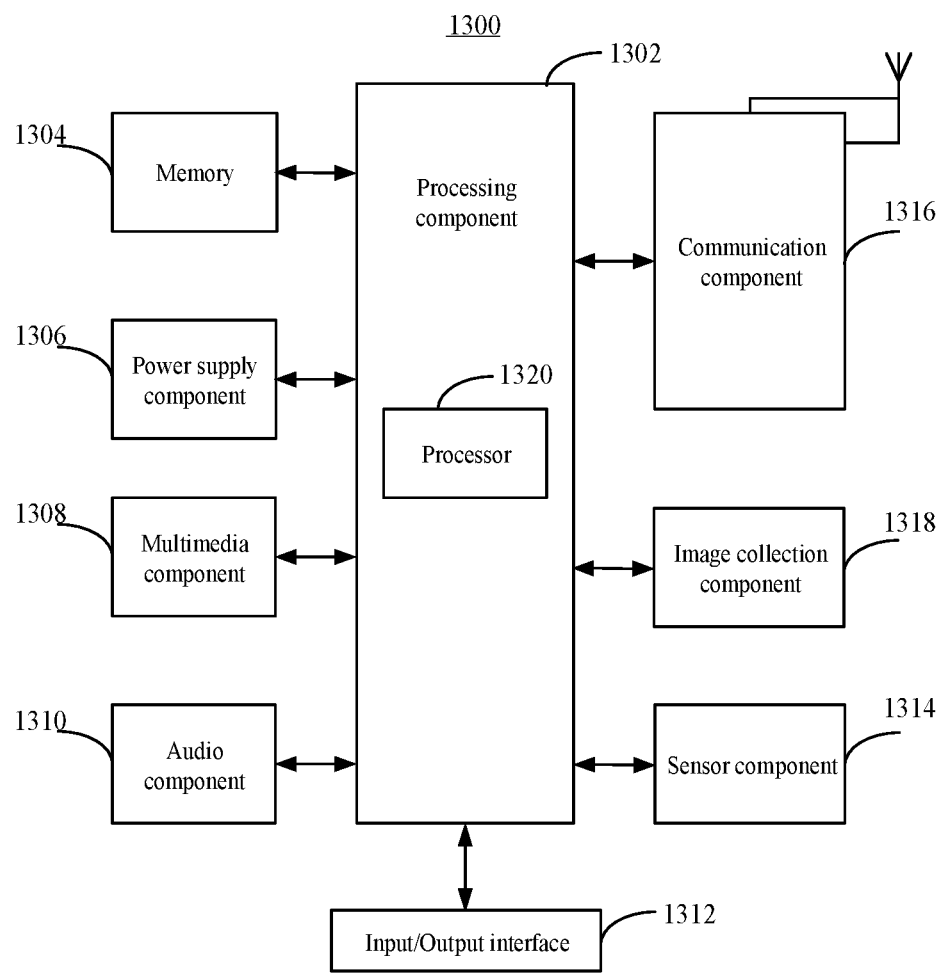
FIG. 13 is a block diagram illustrating a terminal device according to an exemplary embodiment of the present disclosure.

FIG. 13 is a block diagram of a terminal device according to an exemplary embodiment of the present disclosure. For example, the terminal device 1300 may be a smart phone, a computer, a digital broadcast terminal, a tablet device, a medical device, a fitness device, a personal digital assistant, and the above vehicular device and the like.

As shown in FIG. 13, the terminal device 1300 may include one or more of the following components: a processing component 1302, a memory 1304, a power supply component 1306, a multimedia component 1308, an audio component 1310, an input/output (I/O) interface 1312, a sensor component 1314, a communication component 1316, and an image collection component 1318.

The processing component 1302 generally controls overall operations of the terminal device 1300, such as operations associated with display, phone calls, data communications, camera operations, and recording operations. The processing component 1302 may include one or more processors 1320 to execute computer programs. In addition, the processing component 1302 may include one or more modules (not shown) which facilitate the interaction between the processing component 1302 and other components. For example, the processing component 1302 may include a multimedia module to facilitate the interaction between the multimedia component 1308 and the processing component 1302.

The memory 1304 is configured to store various types of data to support the operation on the terminal device 1300. Examples of such data include computer programs for any application or method operated on the terminal device 1300, contact data, phonebook data, messages, pictures, videos, and so on. The memory 1304 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1306 supplies power for different components of the terminal device 1300. The power supply component 1306 may include a power supply management system, one or more power supplies, and other components associated with generating, managing and distributing power for the terminal device 1300. The power supply component 1306 may include a power supply chip (not shown) and a controller (not shown) may communicate with the power supply chip to control the power supply chip to turn on or off a switching device, such that the battery supplies power to the main circuit board or not.

The multimedia component 1308 includes a screen (not shown) that provides an output interface between the terminal device 1300 and a target object. In some examples, the screen may include a liquid crystal display (LCD) and a touch panel (TP). If the screen includes a touch panel, the screen may be implemented as a touch screen to receive input signals from the target object. The touch panel includes one or more touch sensors to sense touches, slides, and gestures on the touch panel. The touch sensor may not only sense the boundary of touch or slide actions but also detect the duration and pressure associated with touch or slide operations.

The audio component 1310 is configured to output and/or input audio signals. For example, the audio component 1310 includes a microphone (MIC) configured to receive external audio file information when the terminal device 1300 is in an operation mode, such as a call mode, a recording mode, and a voice recognition mode. The received audio file information may be further stored in the memory 1304 or transmitted via the communication component 1316. In some examples, the audio component 1310 also includes a loudspeaker for outputting the audio file information.

The I/O interface 1312 provides an interface between the processing component 1302 and a peripheral interface module which may be a keyboard, a click wheel, a button, or the like.

The sensor component 1314 includes one or more sensors for providing a status assessment in various aspects to the terminal device 1300. For example, the sensor component 1314 may detect an open/closed state of the terminal device 1300, and the relative positioning of components, for example, the component is a display screen and a keypad of the terminal device 1300. The sensor component 1314 may also detect a change in position of the terminal device 1300 or a component of the terminal device 1300, the presence or absence of a target object in contact with the terminal device 1300, the orientation or acceleration/deceleration of the terminal device 1300 and a change in temperature of the terminal device 1300. In this example, the sensor component 1314 may include a magnetic sensor, a gyro and a magnetic field sensor, where the magnetic field sensor includes at least one of Hall sensor, thin film magnetoresistance sensor, and magnetic fluid acceleration sensor.

The communication component 1316 is configured to facilitate wired or wireless communication between the terminal device 1300 and other devices. The terminal device 1300 may access a wireless network based on a communication standard, such as WiFi, 2G or 3G, or 4G, or 5G or a combination thereof. In an example, the communication component 1316 receives broadcast information or broadcast associated information from an external broadcast management system via a broadcast channel. In an example, the communication component 1316 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the terminal device 1300 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements.

In an illustrative embodiment, there is further provided a vehicular device, including: a memory and a processor; where the memory is configured to store computer programs executable by the processor, and the processor is configured to execute the computer programs in the memory to perform the above method.

In an exemplary embodiment, there is further provided a non-transitory computer readable storage medium, for example, a memory 1304 including instructions. The executable computer programs may be executed by a processor. The readable storage medium may be Read Only Memory (ROM), Random Access Memory (RAM), CD-ROM, magnetic tape, floppy disk, and optical data storage device and the like.

Other implementations of the present disclosure will be apparent to those skilled in the art from consideration of the specification and practice of the present disclosure herein. The present disclosure is intended to cover any variations, uses, modifications or adaptations of the present disclosure that follow the general principles thereof and include common knowledge or conventional technical means in the related art that are not disclosed in the present disclosure. The specification and embodiments are considered as exemplary only, with a true scope and spirit of the present disclosure indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A device interconnection method, performed by a vehicular device and comprising:
   in response to an operation of starting up a screen mirroring application program, starting up the screen mirroring application program, wherein the screen mirroring application program comprises a screen mirroring identifier used in screen mirroring;

generating an audio file carrying the screen mirroring identifier; and playing the audio file at least once to generate an acoustic wave signal, such that a screen mirroring application program in a terminal device collects the acoustic wave signal, and establishes a screen mirroring link with the vehicular device based on the screen mirroring identifier in the acoustic wave signal.

2. The method of claim 1, wherein generating the audio file carrying the screen mirroring identifier comprises:

obtaining a character string corresponding to the screen mirroring identifier;

based on a preset correspondence between frequency and character, obtaining a frequency corresponding to each character of the character string to obtain a frequency array corresponding to the screen mirroring identifier; and encoding the frequency array to obtain an audio file corresponding to the frequency array.

3. The method of claim 2, wherein encoding the frequency array to obtain the audio file corresponding to the frequency array comprises:

based on each frequency of the frequency array, a preset sampling rate and a sampling point position, obtaining a sine wave signal corresponding to each frequency of the frequency array;

based on the preset sampling rate, the sampling point position and a preset loudness coefficient, obtaining an amplitude of the sine wave signal; and based on the amplitude and the sine wave signal, obtaining an audio code corresponding to each frequency of the frequency array, wherein the audio code corresponding to each frequency of the frequency array forms the audio file.

4. The method of claim 3, wherein based on each frequency of the frequency array, the preset sampling rate and the sampling point position, obtaining the sine wave signal corresponding to each frequency of the frequency array comprises:

obtaining a product of each frequency of the frequency array, the sampling point position and a first preset constant to obtain a first product;

obtaining a quotient value of the first product and the preset sampling rate to obtain the first quotient value; and obtaining a sine wave signal corresponding to the first quotient value to obtain the sine wave signal corresponding to each frequency of the frequency array.

5. The method of claim 3, wherein based on the preset sampling rate, the sampling point position and the preset loudness coefficient, obtaining the amplitude of the sine wave signal comprises:

obtaining a median of the sampling point of each syllable and a squared value of the median to obtain a first squared value;

obtaining a squared value of a difference between the sampling point position and the median to obtain a second squared value;

obtaining a difference between a second preset constant and the second squared value;

obtaining a square root of a ratio of the difference to the first squared value; and obtaining a product of the square root and the preset loudness coefficient to obtain the amplitude of the sine wave signal.

6. The method of claim 1, further comprising:

broadcasting an interconnection request, wherein the interconnection request comprises a broadcast identifier configured to allow the terminal device to start up the screen mirroring application program in response to the broadcast identifier.

7. The method of claim 6, wherein establishing the screen mirroring link with the vehicular device based on the screen mirroring identifier in the acoustic wave signal comprises:

receiving a screen mirroring connection request from the terminal device, wherein the screen mirroring connection request comprises the screen mirroring identifier and the broadcast identifier;

determining whether the screen mirroring identifier in the screen mirroring connection request is consistent with a locally-stored screen mirroring identifier, and when the screen mirroring identifier in the screen mirroring connection request is consistent with the locally-stored screen mirroring identifier, sending vehicular device connection information; and coordinating an authentication key and a session key with the terminal device to establish a screen mirroring link.

8. A device interconnection method, performed by a terminal device and comprising:

enabling an audio collection function of the terminal device;

based on the audio collection function, obtaining an acoustic wave signal carrying a screen mirroring identifier to obtain an acoustic wave file;

analyzing the acoustic wave file to obtain the screen mirroring identifier; and based on the screen mirroring identifier in the acoustic wave signal, establishing a screen mirroring link with a vehicular device.

9. The method of claim 8, wherein analyzing the acoustic wave file to obtain the screen mirroring identifier comprises:

performing Fourier Transform processing on the acoustic wave file to obtain a frequency array in the acoustic wave file; wherein the frequency array is a combination of multiple frequencies; and based on a preset correspondence between frequency and character, obtaining a character corresponding to each frequency of the frequency array, wherein the character corresponding to each frequency of the frequency array forms the screen mirroring identifier.

10. The method of claim 8, wherein enabling the audio collection function of the terminal device comprises:

in response to receiving an interconnection request comprising a broadcast identifier, starting up a screen mirroring application program; and in response to an audio collection enabling request of the screen mirroring application program, enabling the audio collection function of the terminal device.

11. The method of claim 10, wherein establishing the screen mirroring link with the vehicular device based on the screen mirroring identifier in the acoustic wave signal comprises:

sending a screen mirroring connection request, wherein the screen mirroring connection request comprises the screen mirroring identifier and the broadcast identifier;

obtaining vehicular device connection information, wherein the vehicular device connection information is generated when the screen mirroring identifier in the screen mirroring connection request is consistent with a screen mirroring identifier locally stored by the vehicular device; and coordinating an authentication key and a session key with the vehicular device to establish a screen mirroring link.

12. A device interconnection method, comprising:

in response to detecting a trigger operation for a vehicular device, displaying, by the vehicular device, a screen mirroring identifier in this screen mirroring, and playing, by the vehicular device, an audio file carrying the screen mirroring identifier at least once;

by a terminal device, starting up a screen mirroring application program and enabling an audio collection function of the terminal device, and based on the audio collection function, obtaining an acoustic wave signal carrying the screen mirroring identifier to obtain an acoustic wave file, and based on the screen mirroring identifier in the acoustic wave signal, establishing a screen mirroring link with the vehicular device; and sharing, by the vehicular device, currently-displayed contents of the terminal device through the screen mirroring link.

13. A device interconnection system, comprising a vehicular device and a terminal device, wherein the vehicular device and the terminal device are configured to perform the method of claim 12.

14. A vehicular device, comprising:

a processor; and a memory storing computer programs executable by the processor, wherein the processor is configured to execute the computer programs to perform the method of claim 1.

15. A terminal device, comprising:

a processor; and a memory storing computer programs executable by the processor, wherein the processor is configured to execute the computer programs to perform the method of claim 8.

16. A non-transitory computer readable storage medium, storing computer programs thereon, wherein the programs, when executed by a processor, cause the processor to perform the method of claim 1.

17. A non-transitory computer readable storage medium, storing computer programs thereon, wherein the programs, when executed by a processor, cause the processor to perform the method of claim 8.

18. A non-transitory computer readable storage medium, storing computer programs thereon, wherein the programs, when executed by a processor, cause the processor to perform the method of claim 12.

* * * * *